Feb. 1, 1966 JEAN-CLAUDE CHARRON 3,233,081

ELECTROMECHANICAL MEMORY DEVICE

Filed July 28, 1961

United States Patent Office 3,233,081

Patented Feb. 1, 1966

3,233,081

ELECTROMECHANICAL MEMORY DEVICE

Jean-Claude Charron, Saint Mande, France, assignor to Saunier Duval, Societe Anonyme, Paris, France

Filed July 28, 1961, Ser. No. 127,540
Claims priority, application France, Nov. 22, 1960, 844,625, Patent 1,280,678
6 Claims. (Cl. 235—61.11)

This invention relates to improvements in a "memory device," and more particularly to an electromechanical memory device in which the memory medium is a grooved drum and the binary digits of the information to be written-in and read-out are represented by balls inserted into the grooves of the drum.

More precisely the invention relates to electromechanical memory devices of the travelling type in which binary digit words representative of data to be memorized are applied at any suitable or desired rate or time to the input of the memory, then kept memorized therein during any desired time and finally read-out also at a suitable or desired rate or time in the order in which they have been recorded.

Ball and drum memories have been developed in the past as synchronous memories in which the memorized data are recurrently recorded, and read-out or recalled at a predetermined phase relationship or at a plurality of predetermined phase relationships with respect to the moment of recording. These synchronous travelling memories comprise a fixed number of memory stages since the number of words recorded between the recording moment of a given word and the reading-out of the same is constant. In the prior art arrangements, the read-out heads are angularly removed from the recording zone by angles corresponding to the phase-shift desired between recording and reading-out.

The object of the invention is to provide an asynchronous travelling memory of the drum and ball type.

The difficulties which arise in the design of asynchronous travelling memories in which data are recorded and read-out in the same order but non-cyclically is that the memory comprises a variable number of stages. Consequently the detection or read-out units have to take and keep a variable angular position around the drum, just in front of the first word not yet read-out.

According to the invention, the drum and a pivoted arm carrying the detector or read-out heads are interconnected during the data recording process so as to move as a single unit in the forward direction and they are disconnected during the reading-out process, the drum being clamped and the pivoted arm allowed to rotate in the backward direction.

Other objects and advantages of the present invention will be apparent from the accompanying drawings and following detailed description. In the drawings, FIGURE 1 is a diagrammatic sectional view showing the complete assembly, the section being taken through a plane containing one generatrix of the grooved recording drum, termed hereinafter "memory drum";

Figure 1:
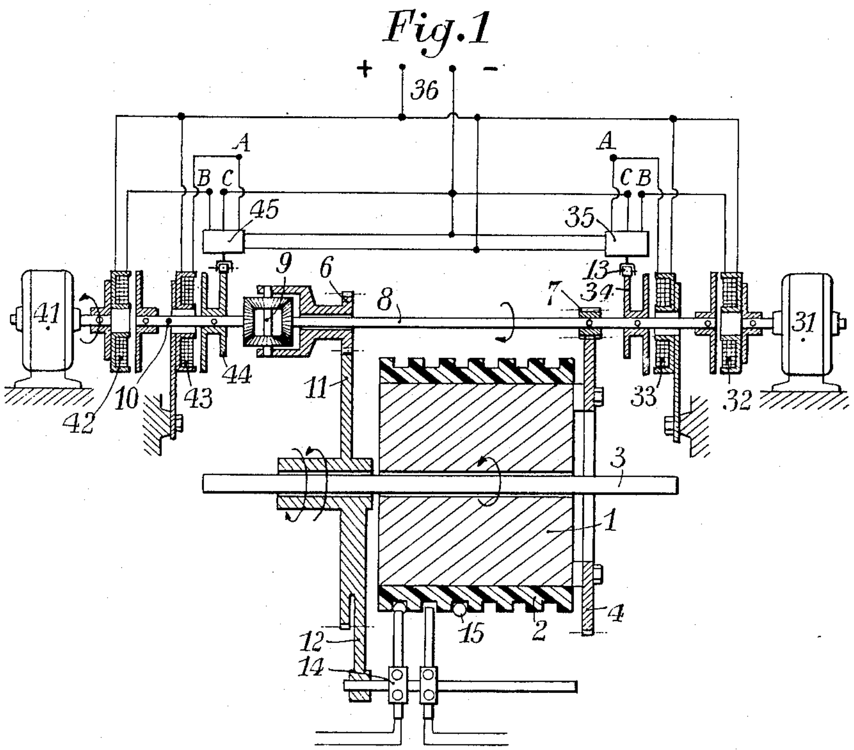

The recording medium incorporated in the memory device of this invention is a rotating drum 1 provided with a plurality of circumferentially extending series of grooves formed in an outer lining 2 of the memory drum 1 made of a resilient material as of rubber or the like.

The binary digits to be recorded and read-out are materialized by operating balls 15 adapted to be forced into the grooves by electromagnetic push-rods 26 incorporated in recording and erasement heads 23 registering or aligned with each groove, these balls being recovered upon completion of the rotary movement by a scraper 28 diverting the balls toward the magazine 25. Push-rods 26 are controlled by electromagnets 24.

The read-out arm 12 supports the detector units 14 each comprising a conventional micro-switch having a stationary spring arm **14*b* and a feeler spring arm 14*a* responsive to the passage of balls 15**.

The read-out arm 12 as well as the memory drum 1 revolve freely about the fixed horizontal shaft 3.

Figure 3:
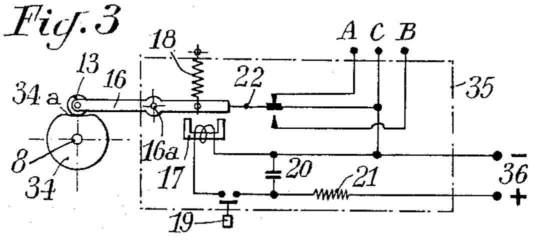
FIGURE 3 is a wiring diagram showing the step-by-step drive applied to the memory drum and to the read-out arm co-acting therewith.
Figure 2:
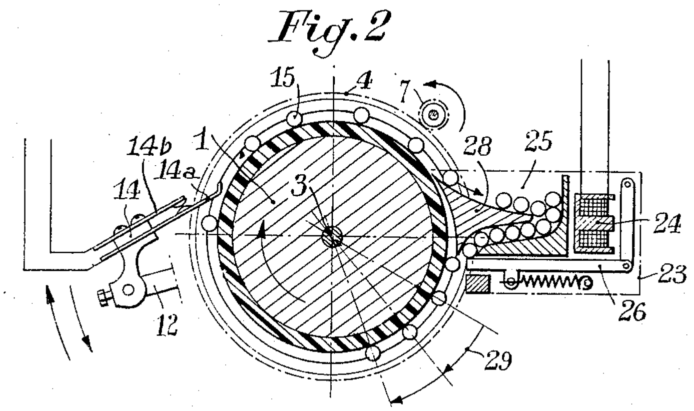
FIGURE 2 is a cross-sectional view of the device.

The step-by-step drive for the memory drum 1 comprises a motor 31 revolving at a constant speed, an electromagnetic clutch 32 whereby the shaft 8 can be drivingly connected instantaneously with the motor 31, an electromagnetic brake 33 whereby the same shaft can be braked immediately when it is disengaged from the motor 31, and a device 35 for controlling the supply of energizing current to the clutch 32 and brake 33. The control device 35 comprises essentially a reversing switch 22 (FIG. 3) responsive to a cam 34 keyed on shaft 8.

The stepwise rotation of shaft 8 is transmitted to the memory drum through a pinion 7 keyed on shaft 8 and a toothed wheel 4 coaxial with and secured to drum 1. The reduction ratio is such that when the shaft 8 performs one revolution the drum rotates through a one-step angular distance as shown by the arrow 29, that is, a distance just sufficient to allow two successive binary digit words written-in on memory drum 1 to be separately read-out without cross-talk.

The step-by-step drive applied to the detector unit carrying arm 12 in relation to the memory drum is obtained in the same manner and comprises the same component elements as those described hereinabove, that is, a constant speed motor 41 revolving in the direction opposite to the motor 31, an electromagnetic clutch 42, an electromagnetic brake 43, a control device 45 of same design as device 35 described hereinabove, and comprising similarly a reversing switch responsive to a cam 44. However, the toothed wheel 11 mounted upon arm 12 is driven by a pinion 6 keyed on the planet carrier of a differential 9 having its sun gears carried by shafts 10 and 8 respectively. The reduction ratio from pinion 6 to wheel 11 is equal to half the reduction ratio provided from pinion 7 to wheel 4, so that when the shaft 8 performs one revolution (shaft 10 being stationary) the pinion 6 solid with the planet carrier accomplishes only a half-revolution, but the detector unit carrying arm 12 and drum 1 rotate strictly with the same steps and in the same direction.

Conversely, when the shaft 10 makes a complete revolution (shaft 8 being stationary), the read-out arm 12 travels backward in relation to drum 1 through a distance exactly equal to the step representing the forward angular movement accomplished by the drum upon each revolution of shaft 8.

The device of this invention operates as follows:

When binary data are to be recorded in the memory drum by inserting balls 15 in its grooves, each recording operation is started by closing a normally open contact 19 incorporated in the control device 35. This contact 19 is connected to the discharge circuit of a capacitor 20 connected in turn through a resistor 21 to the two terminals of a D.C. source 36. Thus, by closing the contact 19 the capacitor 20 is discharged and an electric pulse delivered to the winding of electromagnet 17. This electromagnet 17 will thus attract one of the arms of lever 16 and cause the latter to pivot about the axis **16*a* against the bias of a latch spring 18, whereby the feeler 13 is moved away from cam 34 which was hitherto engaged as a consequence of the action of the spring 18**.

Rocking to its operative position the lever 16 carrying the movable blade of the reversing switch 22 on the one hand closes the circuit between points C and B, so that the electromagnetic clutch 32 is energized, and on the other hand opens the circuit between points A and C to de-energize the electromagnetic brake 33. Under these conditions shaft 8 is driven from motor 31, cam 34 is also rotated and immediately as its rotation begins the obtuse angled indent 34*a* of its periphery will leave its rest position under the feeler 13. Thus cam 34 will prevent this feeler 13 from dropping at the end of the pulse resulting from the discharge of capacitor 20 which started the rotation of shaft 8. In its operative position the contact 22 keeps the electromagnetic clutch 32 energized until the reentrant portion 34*a* of the cam periphery resumes its initial position under the feeler 13. At this time the lever 16 resumes its inoperative position and opens through contact 22 the circuit for energizing clutch 32. At the same time, it closes the circuit for energizing the electromagnetic brake 33 so that the shaft 8 is stopped exactly on the same starting position.

Meanwhile the memory drum 1 as well as the read-out arm 12 have moved together through an angular distance representing one pitch or step. Thus, as said in the introductory part, the read-out or detector units are kept in front of the area of the first word not yet read-out in the forward direction of rotation.

In practice the contact 19 controlling the step-by-step movement of drum 1 is closed only at the end of the pulse having caused one or more balls to engage the corresponding grooves of the memory drum, that is, after each word recording. This can be obtained, as anybody conversant with the art will readily understand, by using known electron or relay means, particularly the so-called relays with sequence action. Under these conditions it will be seen that after each recording pulse acting upon electromagnets 24 the memory drum and read-out arm perform together a one-step movement.

When it is desired to read-out information stored in the memory device a contact similar to the contact 19 of the control device 35 is closed in control device 45. Thus, when an electric pulse is applied to the winding of the electromagnet similar to electromagnet 17, the cam 44 causes (through the same operational sequence as described hereinabove) a one-revolution rotation of shaft 10 but in the opposite direction since the motor 41 rotates in the direction opposite to that of motor 31.

Thus, as shaft 8 is locked against motion by the electromagnetic brake 33, the pinion 6 solid with the planet carrier of differential 9 accomplishes a half-revolution, but since the reduction ratio between pinion 6 and toothed wheel 11 is half the reduction ratio between pinion 7 and wheel 4, the read-out arm 12 rigid with toothed wheel 11 moves backwards through one step equal to the step through it moved as well as the memory drum after each recording pulse.

Of course, any other adequate mechanical or electrical device may be used to provide the step-by-step drive of the memory drum and read-out arm carrying the reading heads or contacts.

Although illustrative embodiments of the invention have been described in detail herein with reference to the accompanying drawing, it is to be understood that the invention is not limited to those precise embodiments, and that various changes and modifications can be effected therein without departing from the scope or spirit of the invention, except as defined in the appended claims.

What I claim is:

1. An electromechanical memory device comprising in combination a cylindrical drum rotatable about an axis and having a resilient material lining, circumferentially extending grooves within said lining, balls cooperating with said grooves and representative of binary digits of data to be recorded, means for selectively forcing said balls into said grooves at positions of the same aligned upon said drum in accordance with data items to be recorded, an arm pivotally mounted about the drum axis, ball detector means carried by said pivoted arm, a first drive means for rotating said drum in a forward direction, a second drive means rotating in a backward direction, means for controlling the ball detector means and reading-out said data items, means controlled by both said forcing means and said controlling and reading-out means for selectively engaging said pivoted arm to said first and second drive means, whereby said drum and pivoted arm rotate as a single unit in the forward direction each time data items are recorded while said pivoted arm rotates alone in the backward direction and said drum remains stationary each time data items are read-out.

2. An electromechanical memory device comprising in combination a cylindrical drum rotatable about an axis and having a resilient material lining, circumferentially extending grooves within said lining, balls cooperating with said grooves and representative of binary digits of data to be recorded, means for selectively forcing said balls into said grooves at positions of the same aligned upon said drum in accordance with data items to be recorded, an arm pivotally mounted about the drum axis, ball detector means carried by said pivoted arm, means controlled by said forcing means for temporarily interconnecting said drum and pivoted arm, means for driving in a step-by-step forward direction both said drum and pivoted arm temporarily interconnected, means for controlling the ball detector means and reading-out said data items, means controlled by said controlling and reading-out means for temporarily disconnecting said drum from said pivoted arm and clamping said drum and means for driving in a step-by-step backward direction said temporarily disconnected pivoted arm.

3. An electromechanical memory device comprising in combination a cylindrical drum rotatable about an axis and having a resilient material lining, circumferentially extending grooves within said lining, balls cooperating with said grooves and representative of binary digits of data to be recorded, means for selectively forcing said balls into said grooves at positions of the same aligned upon said drum in accordance with data items to be recorded, a ball receptacle adapted to direct the balls to said forcing means, an arm pivotally mounted about the drum axis, ball detector means carried by said pivoted arm, means controlled by said forcing means for temporarily interconnecting said drum and pivoted arm, means for driving in a step-by-step forward direction both said drum and pivoted arm temporarily interconnected, means for controlling the ball detector means and reading-out said data items, means controlled by said controlling and reading-out means for temporarily disconnecting said drum and pivoted arm and clamping said drum, means for driving in a step-by-step backward direction said temporarily disconnected pivoted arm, scraper means for extracting the balls from the grooves and means conveying the balls from said scraper means to said ball receptacle.

4. An electromechanical memory device comprising in combination a cylindrical drum rotatable about an axis and having a resilient material lining, circumferentially extending grooves within said lining, balls cooperating with said grooves and representative of binary digits of data to be recorded, means for selectively forcing said balls into said grooves at positions of the same aligned upon said drum in accordance with data items to be recorded, an arm pivotally mounted about the drum axis, ball detector means carried by said pivoted arm, a first shaft for driving the drum, driving means for driving said first shaft in a given direction, a second shaft, driving means for driving said second shaft in a direction opposite to said given direction, driving means for driving said pivoted arm, means for selectively engaging said driving means for said pivoted arm to said first and second shafts, means for controlling the ball detector means and reading-out said data items, a first clutch means inserted between said first shaft and said first shaft driving means and controlled by said forcing means, a second clutch means inserted between said second shaft and said second shaft driving means and controlled by said controlling and reading-out means, whereby the drum and pivoted arm both rotate as a single unit in said given direction when said first cltch means is engaged and said selective engaging means engages the pivoted arm driving means to said first shaft and the pivoted arm rotates alone in the direction opposite to said given direction when said second clutch means is engaged and said selective engaging means engages the pivoted arm driving means to said second shaft.

5. An electromechanical memory device comprising in combination a cylindrical drum rotatable about an axis and having a resilient material lining, circumferentially extending grooves within said lining, balls cooperating with said grooves and representative of binary digits of data to be recorded, means for selectively forcing said balls into said grooves at positions of the same aligned upon said drum in accordance with data items to be recorded, an arm pivotally mounted about the drum axis, ball detector means carried by said pivoted arm, a first shaft for driving the drum, driving means for driving said first shaft in a given direction, a second shaft, driving means for driving said second shaft in a direction opposite to said given direction, driving means for driving said pivoted arm, a differential comprising two sun gears respectively connected to said first and second shafts and a planet carrier connected to the driving means for driving the pivoted arm, means for controlling the ball detector means and reading-out said data items, a first clutch means and a first brake means inserted between said first shaft and said first shaft driving means and controlled respectively in phase-opposition by said forcing means, a second clutch means and a second brake means inserted between said second shaft and said second shaft driving means and controlled respectively in phase-opposition by said controlling and reading-out means, whereby the drum and pivoted arm both rotate as a single unit in said given direction when said first and second clutch means are respectively engaged and disengaged and said first and second brake means are respectively disengaged and engaged and the pivoted arm rotates alone in the direction opposite to said given direction when said first and second clutch means are respectively disengaged and engaged and said first and second brake means are respectively engaged and disengaged.

6. An electromechanical memory device comprising in combination a cylindrical drum rotatable about an axis and having a resilient material lining, circumferentially extending grooves within said lining, a first toothed wheel connected to said drum, balls cooperating with said grooves and representative of binary digits of data to be recorded, means for selectively forcing said balls into said grooves at positions of the same aligned upon said drum in accordance with data items to be recorded, an arm pivotally mounted about the drum axis, a second toothed wheel connected to said pivoted arm, ball detector means carried by said pivoted arm, a first shaft for driving the drum, a first pinion mounted on said first shaft and in meshing engagement with said first toothed wheel with a given reduction ratio, driving means for driving said first shaft in a given direction, a second shaft, driving means for driving said second shaft in a direction opposite to said given direction, a third shaft for driving said pivoted arm, a differential comprising two sun gears respectively connected to said first and second shafts and a planet carrier connected to said third shaft, a second pinion mounted on said third shaft in meshing engagement with said second toothed wheel with a reduction ratio equal to half the given reduction ratio, means for controlling the ball detector means and reading-out said data items, a first clutch means and a first brake means inserted between said first shaft and said first shaft driving means and controlled respectively in phase-opposition by said forcing means, a second clutch means and a second brake means inserted between said second shaft and said second shaft driving means and controlled respectively in phase-opposition by said controlling and reading-out means, whereby the drum and pivoted arm both rotate as a single unit in said given direction when said first and second clutch means are respectively engaged and disengaged and said first and second brake means are respectively disengaged and engaged and the pivoted arm rotates alone in the direction opposite to said given direction when said first and second clutch means are respectively disengaged and engaged and said first and second brake means are respectively engaged and disengaged.

References Cited by the Examiner

UNITED STATES PATENTS

| | | | |
|---|---|---|---|
| 1,359,484 | 11/1920 | Bourne. | |
| 2,948,881 | 8/1960 | Berti et al. | 235—123 X |
| 3,013,445 | 12/1961 | Enssle | 235—68 X |
| 3,028,579 | 4/1962 | McCarter | 235—61.111 |
| 3,057,224 | 10/1962 | Svaty | 235—68 |

ROBERT C. BAILEY, *Primary Examiner.*

WALTER W. BURNS, JR., MALCOLM A. MORRISON, *Examiners.*